United States Patent [19]

Chen

[11] Patent Number: 5,320,318
[45] Date of Patent: Jun. 14, 1994

[54] MONITOR FILTER SCREEN MOUNTING DEVICE

[75] Inventor: Tsu-Shiea Chen, Taipei, Taiwan

[73] Assignee: RCS Technology Corporation, Taipei, Taiwan

[21] Appl. No.: 57,520

[22] Filed: May 6, 1993

[51] Int. Cl.$^5$ .............................................. E04G 3/00
[52] U.S. Cl. ................... 248/286; 248/291; 248/918; 248/293; 359/609
[58] Field of Search ............. 358/245, 250, 252, 253, 358/248, 249, 254, 255; 359/609, 601, 610, 613, 614, 895; 248/293, 286, 918, 309.1, 447.1, 124, 291, 276

[56] References Cited

U.S. PATENT DOCUMENTS

| | | | |
|---|---|---|---|
| 1,546,739 | 7/1925 | Lande | 248/293 |
| 1,552,199 | 9/1925 | Beckman | 248/293 |
| 1,676,896 | 7/1928 | Groenanstein | 248/286 |
| 4,577,928 | 3/1986 | Brown | 358/252 X |
| 4,633,322 | 12/1986 | Fowrny | 358/253 X |
| 4,712,870 | 12/1987 | Robinson et al. | 358/250 X |
| 5,048,928 | 9/1991 | Davis | 358/250 X |

FOREIGN PATENT DOCUMENTS 0385037  5/1990  European Pat. Off. ........ 358/253 X

Primary Examiner—David A. Scherbel
Assistant Examiner—Korie H. Chan
Attorney, Agent, or Firm—Robert A. Green

[57] ABSTRACT

A monitor filter screen mounting device has a mounting block, a slide block slidably connected to the locating block by an adjusting screw to hold a filter screen in front of a monitor by a suspension arm, the suspension arm having one end pivoted to a cross bar on the filter screen at the top and an opposite end pivotably mounted on a round head pivot bolt and releasably retained to the slide block at a desired angular position by toothed joints. The position of the filter screen is adjusted horizontally and vertically by means of controlling the adjusting screw and the round head pivot bolt.

7 Claims, 5 Drawing Sheets

MONITOR FILTER SCREEN MOUNTING DEVICE

BACKGROUND OF THE INVENTION

1. Field of the Invention

The present invention relates to a filter screen mounting device for mounting a filter screen on a monitor which allows the filter screen to be adjusted vertically as well as horizontally.

2. Description of the Prior Art

A variety of monitor filter screens are known, and widely used to protect the eyes from the glare of the monitor. These monitor filter screens commonly have a pair of hinged angle bars for mounting on the housing of a monitor in the front of the display screen thereof. Because the hinged angle bars can not bear a heavy load, a monitor filter screen of this type may drop from the monitor easily. Further, these monitor filter screens can not be adjusted neither horizontally nor vertically when installed.

SUMMARY OF THE INVENTION

The present invention has been accomplished under the aforesaid circumstances. It is therefore an object of the present invention to provide a monitor filter screen mounting device which allows the monitor filter screen to be firmly suspended in front of the display screen of the monitor. It is another object of the present invention to provide a monitor filter screen mounting device which allows the monitor filter screen to be conveniently adjusted horizontally as well as vertically as desired.

According to the preferred embodiment of the present invention, the monitor filter screen mounting device comprises a mounting block mounted on the casing of a monitor at the top, which has an adjusting screw threaded into a through hole thereon, a slide block made to slide forwards and backwards on the locating block, which comprises two parallel projecting arms bilaterally disposed at the front and a screw hole at the back into which the adjusting screw is threaded, a cross bar suspended between two upright supports on the frame of a monitor filter screen at the top, and a suspension arm to suspend the cross bar from the slide block, which has a front end pivotably mounted on the cross bar and a rear end retained between the two projecting arms of the slide block.

According to another aspect of the present invention, the rear end of the suspension arm is pivotably fastened between the two projecting arms of the slide block by a round head pivot bolt and a cap nut.

According to still another aspect of the present invention, the round head pivot bolt comprises a shoulder portion at one end connected to the round head and inserted in a pin hole on one projecting arm of the slide block to squeeze the suspension arm against the other projecting arm.

According to still another aspect of the present invention, the suspension arm has locating teeth at one side thereof releasably engaged with respective locating teeth on the adjacent projecting arm of the slide block, and therefore the suspension arm is firmly retained in position.

According to still another aspect of the present invention, the slide block comprises a sliding way on the inside fitted over two bilateral guide rails on the locating block, and therefore the slide block can be moved forwards or backwards on the locating block as the adjusting screw is turned in either direction.

According to still another aspect of the present invention, the screw hole on the slide block is made on a projecting post longitudinally aligned with the through hole on the mounting block.

DETAILED DESCRIPTION OF THE PREFERRED EMBODIMENT

Figure 1:
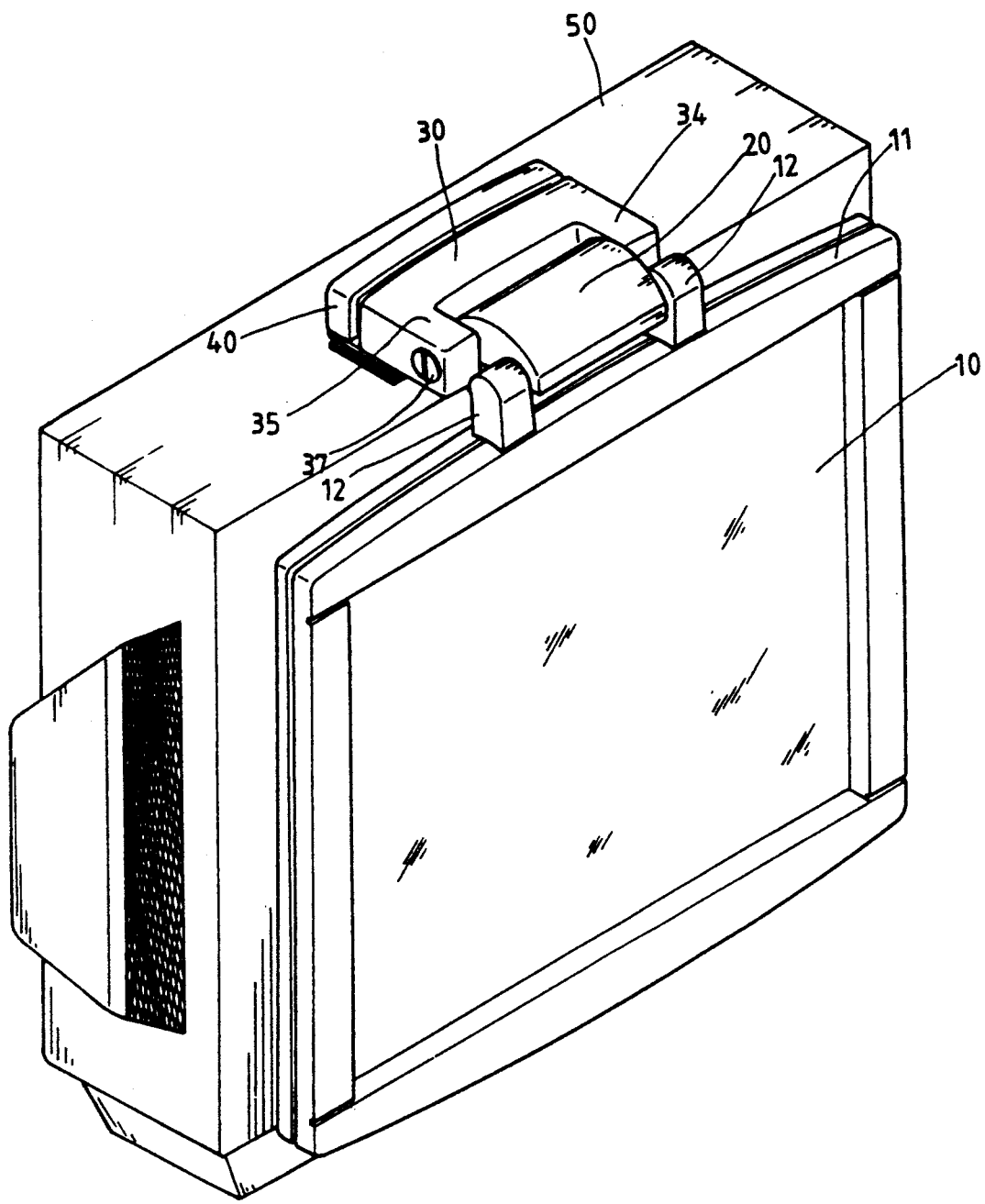
FIG. 1 is a perspective oblique view showing the preferred embodiment of the filter screen mounting device of the present invention installed in a monitor to hold a filter screen in place.
Figure 2:
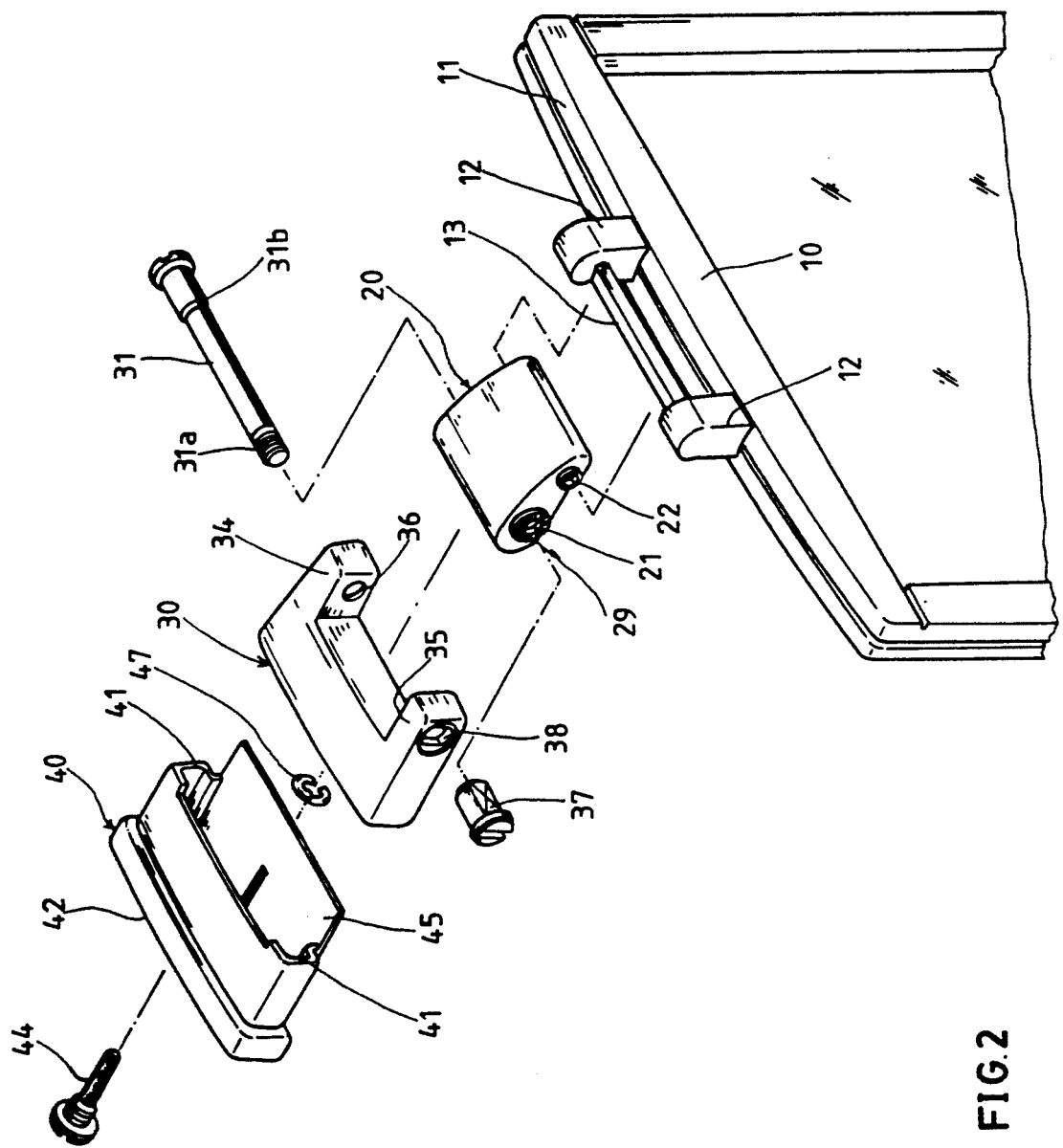
FIG. 2 is a perspective exploded view of the filter screen mounting device shown in FIG. 1.

Referring to FIGS. 1 and 2, two upright supports 12 are mounted on the top frame 11 of a filter screen 10 to hold a cross bar 13. A suspension arm 20 is pivotally mounted on the cross bar 13, having an opposite end releasably retained between two hollow projecting arms 34;35 of a slide block 30, which is made to slide on a hollow mounting block 40.

Figure 3:
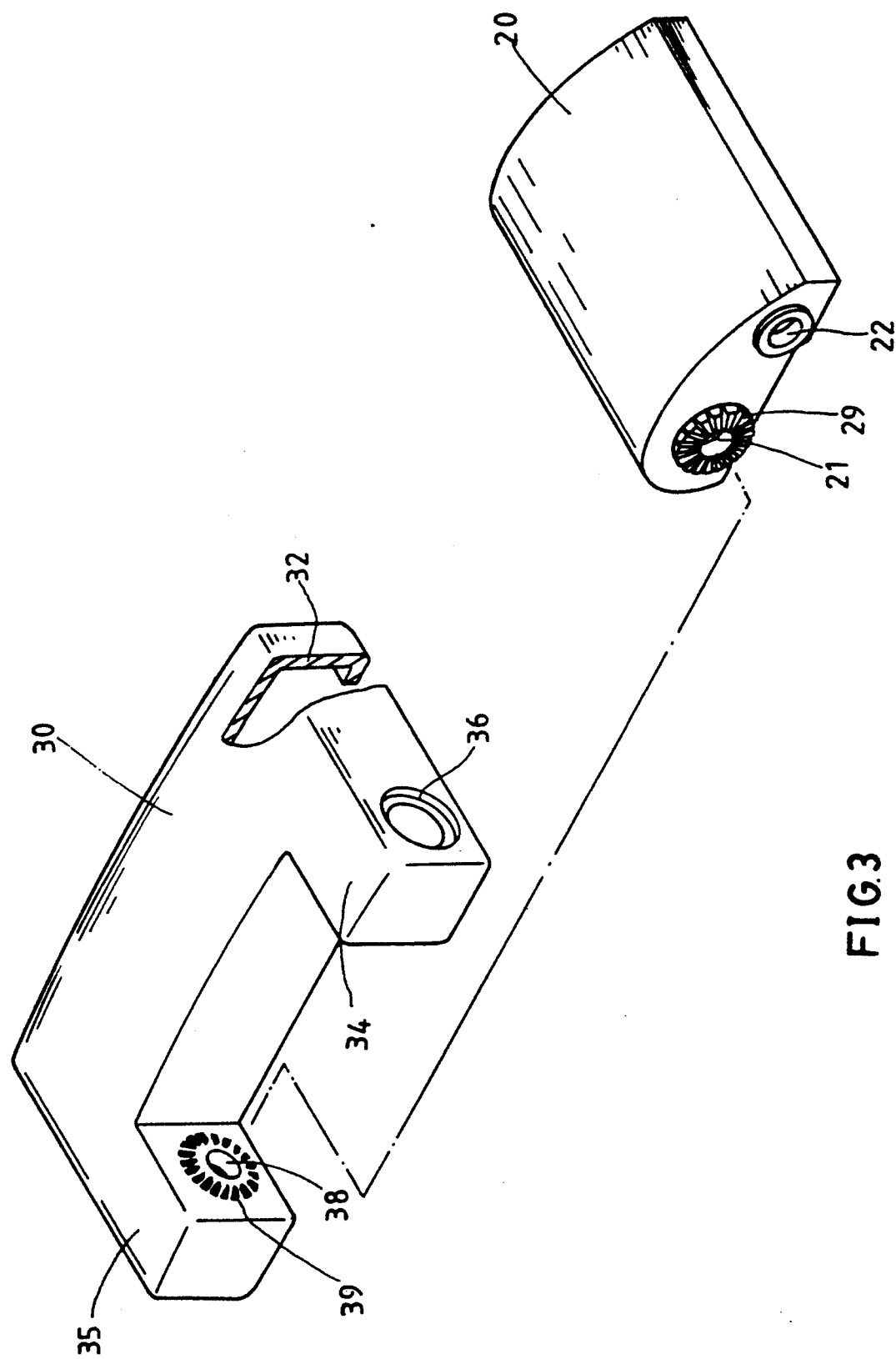
FIG. 3 is a perspective exploded view of the slide block and the suspension arm of the filter screen mounting device obliquely viewed from another direction.

Referring to FIG. 3 and FIGS. 1 and 2 again, suspension arm 20 is made in the shape of a block having a first through hole 21 and a second through hole 22 at two opposite ends through its width. Through the first through hole 21, a round head pivot bolt 31 is inserted to secure suspension block 20 between the two hollow projecting arms, namely, the first projecting arm 34 and the second projecting arm 35 of slide block 30. Through second through hole 22, cross bar 13 is inserted to hold suspension arm 20 to filter screen 10 at the top. Radial teeth 29 are made on the suspension arm 20 around the first through hole 21 at one end.

Figure 4:
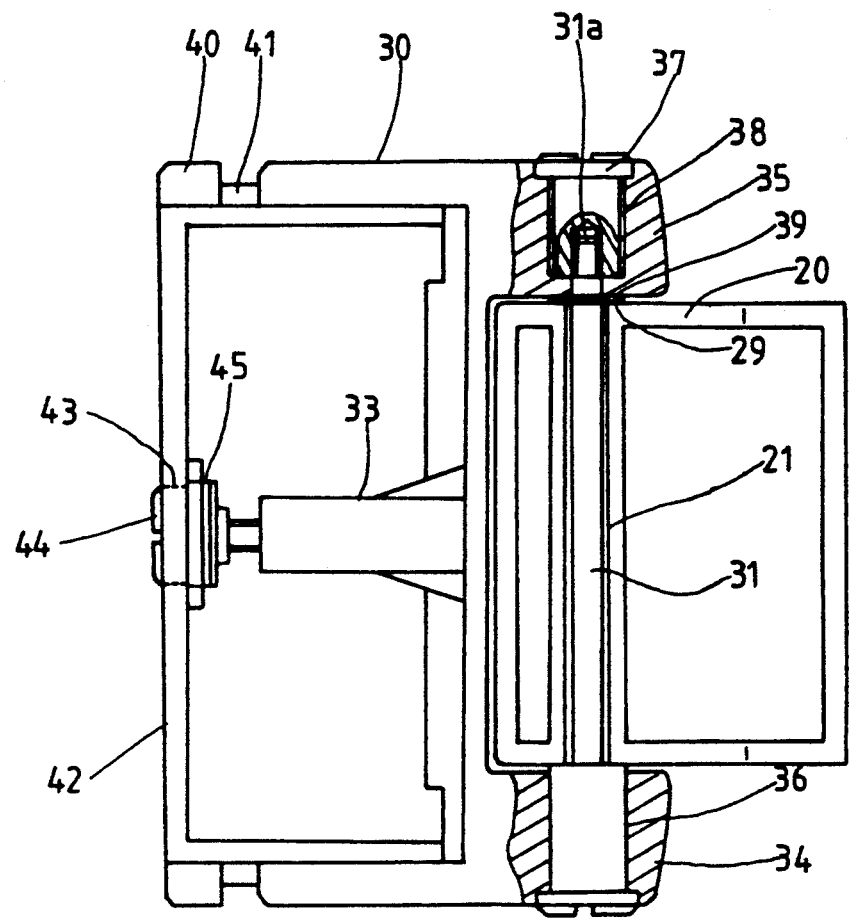
FIG. 4 is a bottom view of the filter screen mounting device when the bottom panel of the locating block removed.
Figure 5:
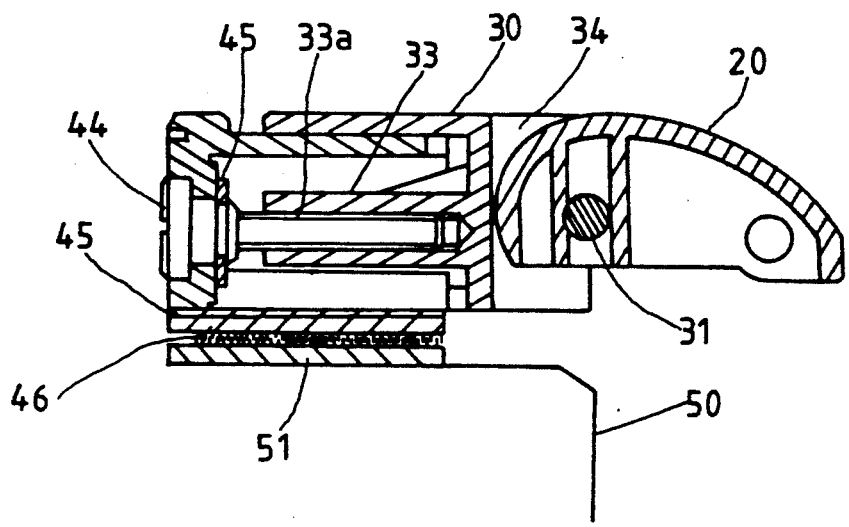
FIG. 5 is a longitudinal sectional view showing the suspension arm connected to the locating block by the slide block in the horizontal position.

Slide block 30 is made in the shape of a hollow case having a substantially U-shaped transverse section and defining a C-shaped sliding way 32 on the inside. As illustrated in FIGS. 4 and 5, slide block 30 comprises a post 33 with a longitudinal screw hole 33a. Post 33 is horizontally suspended within the C-shaped sliding way 32 in the middle. Countersunk holes 36;38 are respectively made on the projecting arms 34;35 in the transverse direction. Second projecting arm 35 comprises radial teeth 39 around countersunk hole 38 thereof at an inner side respectively meshed with radial teeth 29 on the suspension arm 20. Round head pivot bolt 31 comprises a shoulder portion 31b abutting the round head thereof and an outer thread 31a around the peripheral surface of the rear end thereof. The length of the shoulder portion 31b is longer than the transverse thickness of first projecting arm 34. As round head pivot bolt 31 is inserted through the countersunk hole 36 on first projecting arm 34, the first through hole 21 on the suspension arm 20 into countersunk hole 38 on second projecting arm 35 with its outer thread 31a screwed up with a cap nut 37, shoulder portion 31b pushes suspension arm 20 toward second projecting arm 35, causing radial teeth 39;29 tightly engaged together. When connected, suspension arm 20 is firmly retained to slide block 30 between the projecting arms 34;35, and maintained in horizontal with projecting arms 34;35. As round head pivot bolt 31 is loosened to release its shoulder portion 31b from suspension arm 20, radial teeth 29 on suspension arm 20 are disengaged from radial teeth 39 on second projecting arm 35 of slide block 30, and therefore suspension arm 20 can be freely rotated on cross bar 13.

The hollow mounting block 40 has a front opening into which post 33 of slide block 30 inserts. Two guide rails 41 are bilaterally formed on hollow mounting block 40 and fitted into the sliding way 32 for permitting slide block 30 to be slided on mounting block 40. A countersunk hole 43 is made on back panel 42 of mounting block 40 in the middle, through which an adjusting screw 44 is inserted and then threaded into screw hole 33a on post 33 of slide block 30. When connected, a clamp 47 is fastened to adjusting screw 44 to hold it to mounting block 40. Further, bottom panel 45 has a fastening device 46 at the bottom, which can be fastened to a fastening device 51 on the housing 50 of the monitor at the top. Fastening device 46;51 can be a magic tape (velcro) or self-sticking pad.

Figure 7:
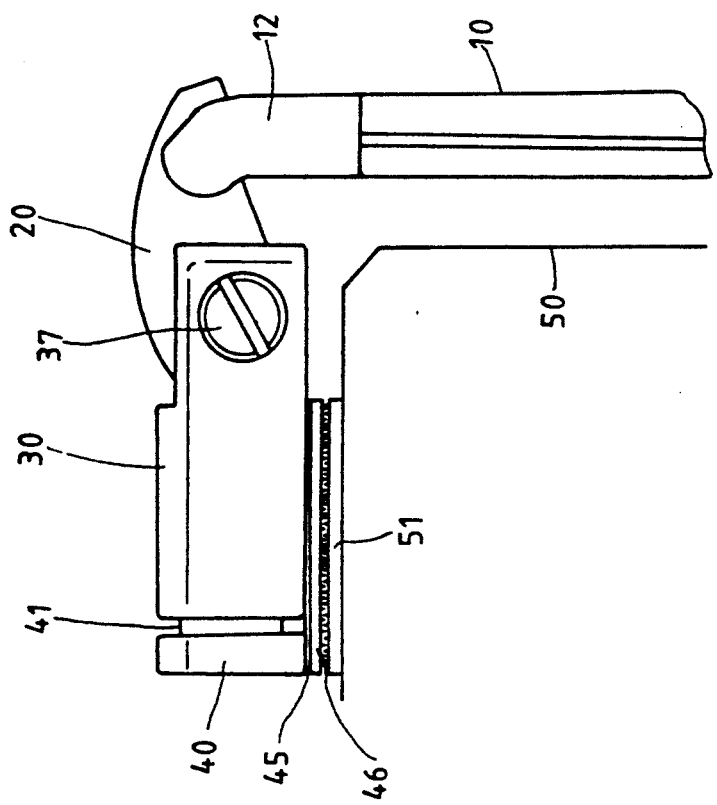
FIG. 7 is similar to FIG. 6 but showing the suspension arm adjusted upwards to lift the filter screen.
Figure 6:
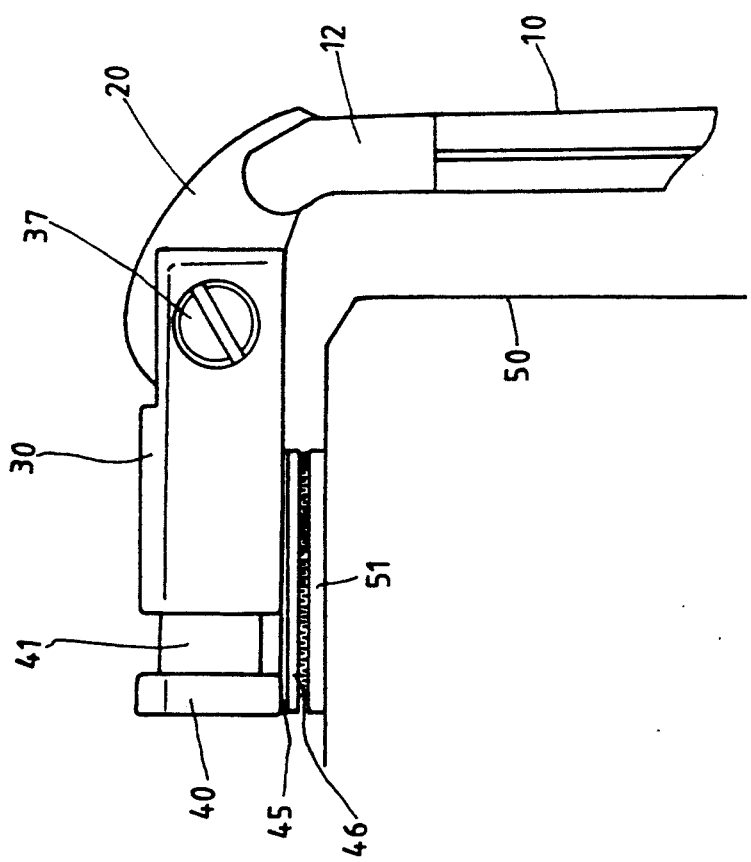
FIG. 6 is a plan installed view showing the filter screen suspended from the slide block by the suspension arm and spaced from the housing of the monitor.

Referring to FIGS. 5, 6, 7 and FIG. 1 again, after fastening device 46 on mounting block 40 has been fastened to fastening device 51 on housing 50 of the monitor, mounting block 40 becomes firmly retained to housing 50 of the monitor, and therefore the filter screen 10 can be suspended from suspension arm 20 according to the aforesaid mounting procedure. After installation, the distance between filter screen 10 and the display screen of the monitor can be conveniently adjusted by turning adjusting screw 44 in either direction to move slide block 30 forwards or backwards on mounting block 40 by means of the guide of the guide rails 41, and therefore the filter screen 10 is moved forwards or backwards relative to the display screen of the monitor, by slide block 30 via suspension arm 20. The vertical position of filter screen 10 can also conveniently adjusted by loosening the round head pivot bolt 31, then turning suspension arm 20 on round head pivot bolt 31 to lift or lower the filter screen 10, and then tightening up round head pivot bolt 31 again as the angular position of suspension arm 20 is set.

While only one embodiment of the present invention has been shown and described, it will be understood that various modifications and changes could be made without departing from the spirit and scope of the invention.

What is claimed is:

1. A monitor filter screen mounting device comprising:
    a mounting block mounted on the housing of a monitor at the top, said mounting block having an adjusting screw threaded into a hole thereon in a longitudinal direction;
    a slide block made to slide said mounting block along said longitudinal direction, said slide block comprising a first projecting arm and a second projecting arm bilaterally disposed along said longitudinal direction at the front, and a screw hole at a back thereof into which said adjusting screw is threaded;
    a frame for holding a monitor filter screen having a cross bar suspended between two upright supports at a top thereof; and
    a suspension arm to suspend said cross bar from said slide block, said suspension arm having a front end pivotally mounted on said cross bar and a rear end retained between the two projecting arms of said slide block, of the rear end of said suspension arm being adjustable in an angular position relative to said slide block.

2. The monitor filter screen mounting device of claim 1 wherein the rear end of said suspension arm is pivotably fastened between the two projecting arms of said slide block by a round head pivot bolt.

3. The monitor filter screen mounting device of claim 2 wherein said round head pivot bolt comprises a shoulder portion at one end connected to a round head thereof and inserted in a pin hole on the first projecting arm of said slide block, a cylindrical body portion in the middle inserted through a through hole on the rear end of said suspension arm, and a screw rod portion at an opposite end inserted in a pin hole on the second projecting arm of said slide block and locked in place by a cap nut.

4. The monitor filter screen mounting device of claim 3 wherein the shoulder portion of said round head pivot bolt has a length longer than the length of the pin hole of the first projecting arm, and is stopped against said suspension arm to hold said suspension arm in a desired angular position relative to said slide block.

5. The monitor filter screen mounting device of claim 3 or 4 wherein said suspension arm has locating teeth at one side thereof releasably meshed with respective locating teeth on the second projecting arm of said slide block.

6. The monitor filter screen mounting device of claim 1 wherein said slide block comprises a sliding way on the inside fitted over two bilateral guide rails on said locating block for sliding along said longitudinal direction.

7. The monitor filter screen mounting device of claim 1 or 6 wherein the screw hold on said slide block is made on a projecting post inside said slide block.

* * * * *